Feb. 21, 1928.

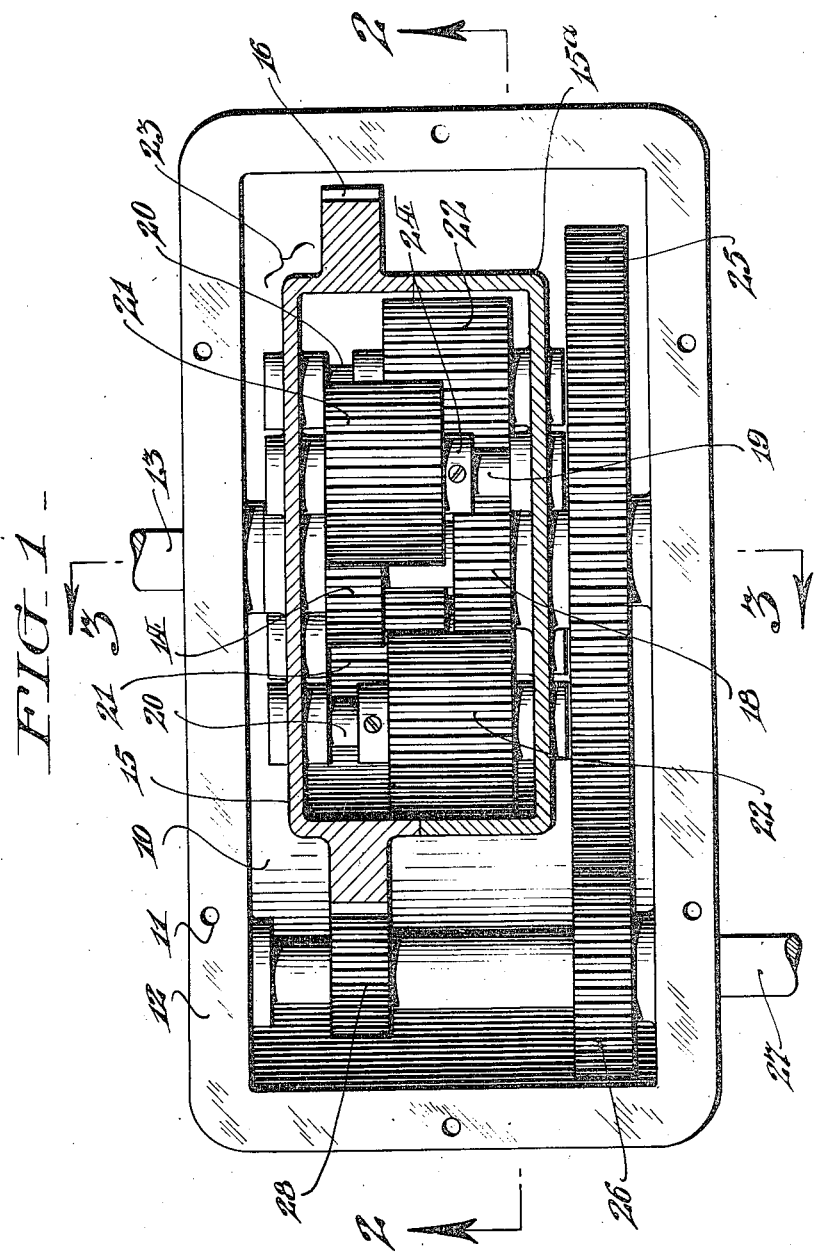

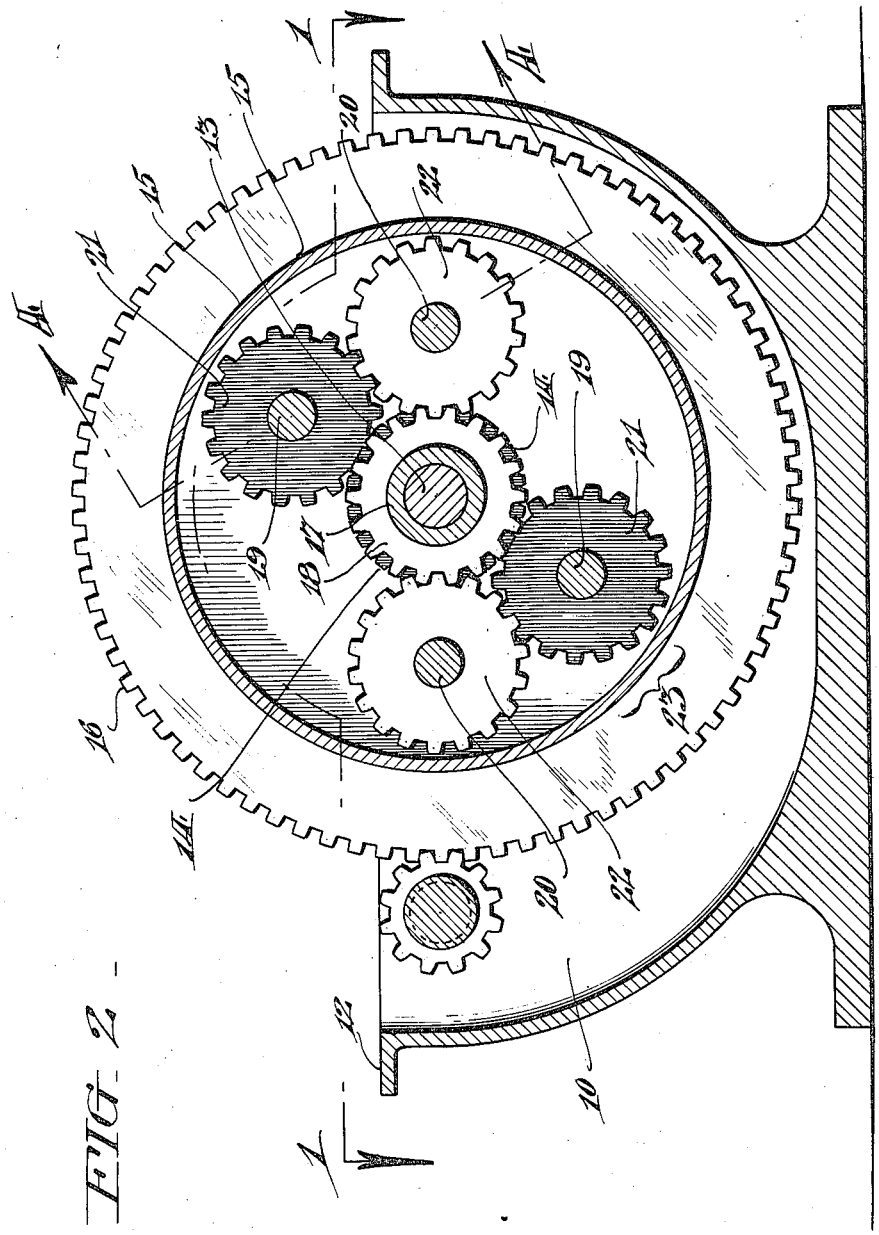

P. J. KILCULLEN

REDUCTION GEARING

Filed Aug. 23, 1927

WITNESSES:

INVENTOR:
Patrick J. Kilcullen,
BY
ATTORNEY.

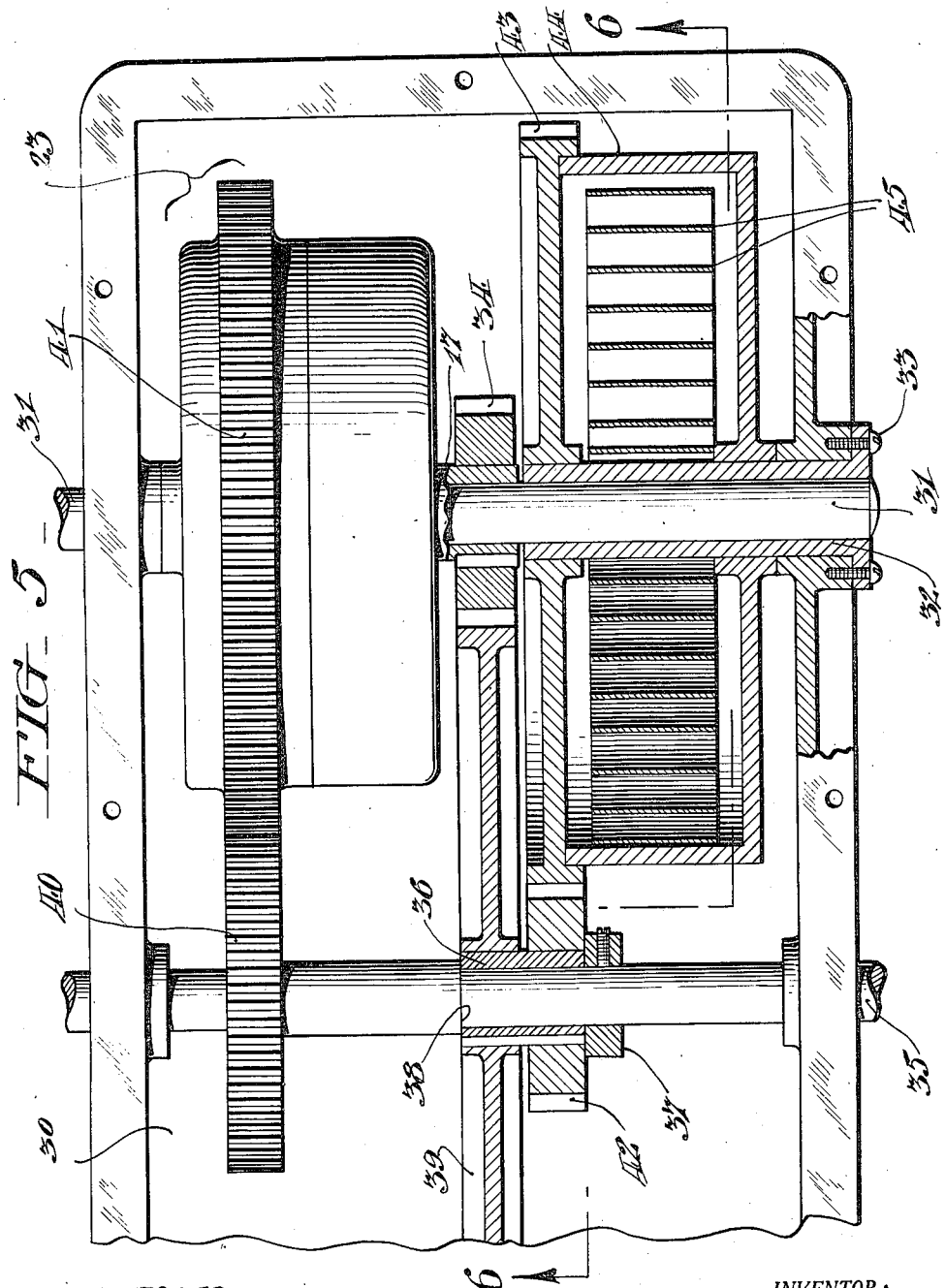

Feb. 21, 1928. 1,659,571

P. J. KILCULLEN
REDUCTION GEARING
Filed Aug. 23, 1927 5 Sheets-Sheet 5

WITNESSES:

INVENTOR:
Patrick J. Kilcullen,
BY
Joshua R. H. Potts
ATTORNEY

Patented Feb. 21, 1928.

1,659,571

UNITED STATES PATENT OFFICE.

PATRICK J. KILCULLEN, OF PHILADELPHIA, PENNSYLVANIA.

REDUCTION GEARING.

Application filed August 23, 1927. Serial No. 214,803.

My invention relates to reduction gearing and more particularly to a set of reduction gears having a cushioning device forming a part thereof.

In starting a load, it is well known that the sudden shock is detrimental to the driving mechanism and the object of my invention is to provide means for gradually loading the driving mechanism and to allow the driving mechanism to accelerate to its working speed before starting the load.

This object, and other advantageous ends which will appear hereinafter, I attain in the following manner, reference being had to the accompanying drawings in which Figure 1 is a top plan view, taken substantially on the irregular line 1—1 on Figure 2 of a set of reduction gears having a planetary unit such as is employed in my invention; the gear case being shown in cross-section in order to expose the gears therein.

Figure 2 is a vertical longitudinal sectional view taken substantially on line 2—2 on Figure 1, Figure 3 a cross-sectional view taken on line 3—3 on Figure 1, and Figure 4 a fragmentary cross-sectional view taken substantially on line 4—4 on Figure 2.

Figure 5 is a fragmentary sectional plan view of an embodiment of my invention, taken substantially on line 5—5 on Figure 6 but with certain of the parts shown in full.

Figure 4:
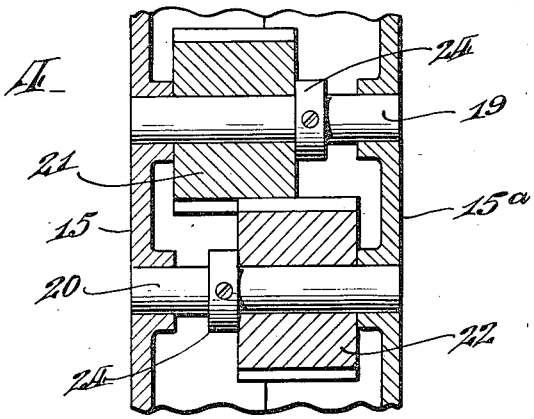
Figure 3:
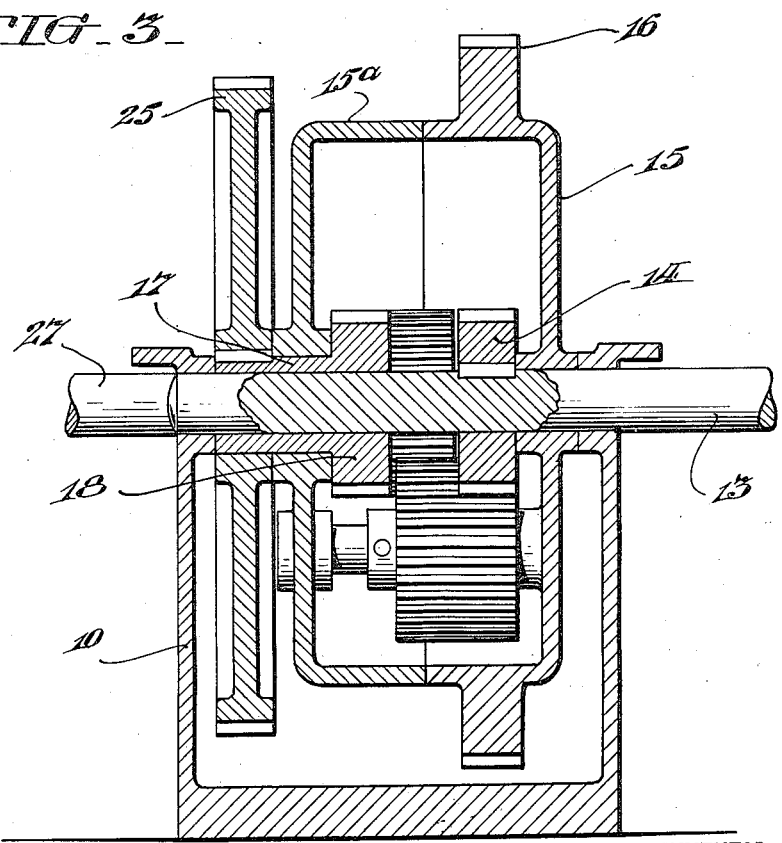

Referring now more particularly to Figures 1, 2, 3 and 4, the device shown has a housing 10, adapted to contain oil for lubricating the gears, to which a cover or cap may be attached in any suitable manner, as by bolts passed through holes 11 formed in a flange 12 which extends around the top of the housing.

A main shaft 13 is journaled in suitable bearings formed in the side walls of housing 10 and has a gear 14 keyed thereon. A gear case 15 has a gear 16 formed on its periphery and is rotatably mounted on shaft 13 between gear 14 and one wall of housing 10. The cover 15ª of gear case 15, which is securely attached to gear case 15 in any suitable manner so as to practically form a part thereof, is rotatably mounted on the hub 17 of a gear 18 which is rotatably mounted on shaft 13; the end of hub 17 preferably abutting the other side wall of housing 10 and gear 18 being disposed within the gear case.

Two shafts 19 and two shafts 20 are secured in the walls of gear case 15 and gear case cover 15ª on a circle struck from the center of shaft 13; the two shafts 19 being disposed diametrically opposite one another and one shaft 20 is spaced from each shaft 19 a distance equal to the pitch diameter of the gears mounted on these shafts. A gear 21 is rotatably mounted on each shaft 19 and meshes with gear 14 while a gear 22 is rotatably mounted on each shaft 20 and meshes with gear 18 and with a gear 21. While but one each of shafts 19 and 20 and gears 21 and 22 are necessary for the device to function, two of each have been provided in order to balance gear case 15 and to distribute the loads over twice as many gear teeth, thus producing an easy running planetary unit which has been designated in general by the numeral 23. Gears 14, 18, 21 and 22 have been shown as having the same pitch diameter but gears 14 and 18 may readily have different pitch diameters than planetary gears 21 and 22 when desired.

It is evident that, if gear case 15 is held stationary, and gear 18 revolved, gear 14 will be revolved at the same speed as gear 18 but in an opposite direction while, if gear 18 is held stationary and gear case 15 revolved, gear 14 will be revolved at twice the speed of gear case 15 as the diameter of the circle on which planetary gears 21 and 22 are mounted is equal to the sum of the diameters of a gear on shaft 13 and a gear with which it meshes. By referring to Figure 1, it will be noted that gears 21 and 22 are approximately twice the thickness of gears 14 and 18 so that one part of each gear 21 may mesh with gear 14 and its other part mesh with a gear 22, while the part of each gear 22 not in mesh with gear 21 meshes with gear 18; gears 21 and 22 being held against axial movement by being mounted between bosses formed on the gear case and collars 24 suitably secured to shafts 19 and 20.

Hub 17 extends beyond the cover of gear case 15 and has a gear 25 fixed to its outer end and adapted to mesh with a gear 26 fixed on a shaft 27 rotatably mounted in housing 10 and having another gear 28 fixed thereon and meshing with gear 16. If rotation is imparted to shaft 27, gear 26 will rotate 25 which, being fixed to gear 18, will cause rotation of gear 14 through gears 21 and 22 while gear 28, being also secured to shaft 27 and meshing with gear 16, will cause rotation of gear case 15. The speed of shaft 13, relative to the speed of shaft 27, will depend upon the ratio between gears 28 and 16 and between gears 25 and 26; and it is found that but slight variation in these ratios will make a great difference in the relative speeds of the two shafts.

For the purpose of illustration, all the gears in gear case 15 have been shown as having eighteen teeth, gear 25 as having sixty-nine teeth, gear 26 as having twenty-one teeth, gear 28 as having twelve teeth, and gear 16 as having seventy-eight teeth. Assuming that shaft 27 is rotating at the rate of 299 R. P. M. in an anti-clockwise direction, gears 25 and 18 will rotate 91 R. P. M. in a clockwise direction and gear 16 will rotate 46 R. P. M. in a clockwise direction.

Now if gear case 15 remains stationary, shaft 13 will be rotated at the same speed as gear 18 but in an anti-clockwise direction due to the fact that gears 14, 18, 21 and 22 are the same size. If gear 18 remains stationary while gear case 15 is revolving at 46 R. P. M., shaft 13 will be rotated twice as fast as the gear case, or 92 R. P. M., due to the fact that the diameter of the circle upon which the planetary gears 21 and 22 are mounted is twice the pitch diameter of gears 14 and 18. As the rotation imparted through gear case 15 and the planetary gears tends to rotate shaft 13 at 92 R. P. M. in a clockwise direction and the rotation imparted through gear 18 and the planetary gear tends to rotate shaft 13 at 91 R. P. M. in an anti-clockwise direction, it is evident that the resultant speed of shaft 13 will be the difference between these two speeds or one R. P. M. in a clockwise direction, thus giving a reduction of 299 to 1.

As changing the ratio between the center gears and planetary gears, between gears 16 and 28, between gears 25 and 26, or making any two or all of these changes, will change the ratio of the speeds of shafts 13 and 27, it is evident that any reduction desired may be readily obtained by employing my improved reduction gearing.

Figure 6:
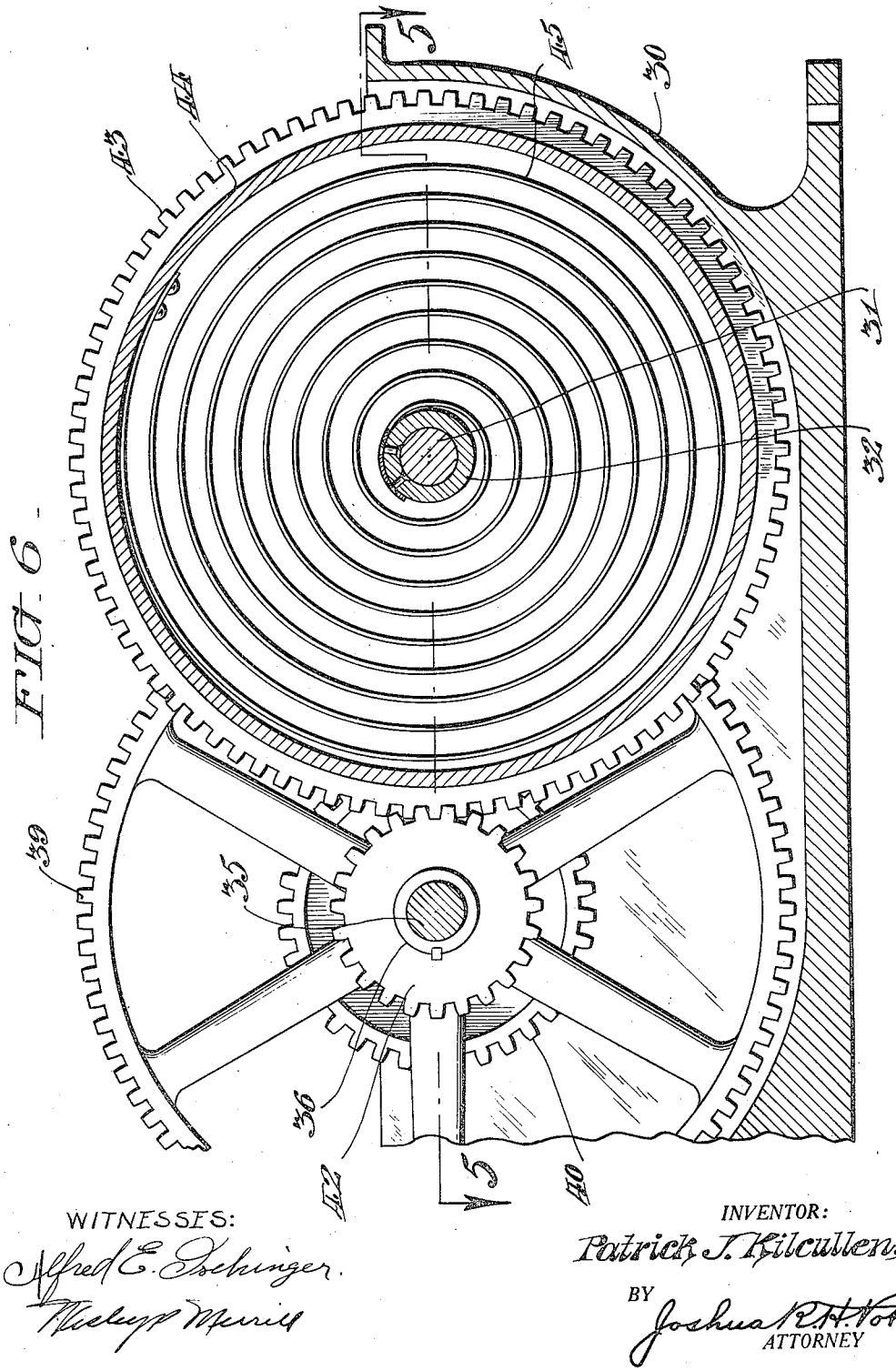
Figure 6 is a fragmentary longitudinal sectional view of the device shown in Figure 5 and taken substantially on line 6—6 on that figure.

Figures 5 and 6 show a device for assisting a driving mechanism in starting its load in which is included the planetary unit shown in Figures 1 to 4. The device is shown mounted in a housing 30 and including gears of different ratios than those shown in Figures 1 to 4. A shaft 31 is rotatably mounted in housing 30 and in a quill 32 which is fixed in one side of housing 30 in any suitable manner, as by screws 33 or by forming a square portion on the quill which fits in a square hole in the housing. A planetary unit 23 is mounted on shaft 31 and has a gear 34 fixed on hub 17. A shaft 35 is rotatably mounted in housing 30 and has a quill 36 rotatably mounted thereon and held against axial movement by a collar 37 and a shoulder 38 formed on shaft 35. A gear 39 is fixed on quill 36 and meshes with gear 34, and a gear 40 fixed on shaft 35 meshes with a gear 41 formed on the periphery of planetary unit 23. A gear 42 is fixed on quill 36 and meshes with a gear 43 rotatably mounted on quill 32 and having a drum 44 rigidly secured thereto which contains a spiral spring 45 having one of its ends secured to drum 44 and its other end secured to quill 32.

Gear 41 has been shown as having a pitch diameter twice that of gear 40 and gears 39 and 43, which are the same size, as having pitch diameters three and one-half times those of gears 34 and 42. If gear 34 were held against rotation and shaft 31 rotated at 98 R. P. M., gear 41 would be rotated at 49 R. P. M., due to the ratios of the gears in the planetary unit, and gear 40 and shaft 35 would be rotated at 98 R. P. M., or at the same speed as shaft 31.

Now if shaft 35 was connected to other machinery, inertia would tend to hold shaft 35 against rotation and cause gear 34 to rotate gear 39 and consequently cause rotation of gear 43 against the action of spring 45. When the tension on spring 45 exceeded the torque required to start the load on shaft 35, this shaft would begin to rotate, as the power plant, which drives shaft 31, has been enabled to accelerate to its working speed. This feature is of prime importance when the power is furnished by an internal combustion engine.

This application has been shown for illustrative purposes only as it is evident that the relative speeds of shafts 31 and 35 may be readily changed by changing the gear ratios and that the principle illustrated in Figures 5 and 6 may be adapted to many applications in combination with the gearset illustrated in Figures 1 to 4. It is also evident that the structures illustrated might be radically altered without departing from the spirit of the invention, and hence I do not limit myself to the precise construction set forth, but consider that I am at liberty to make such changes and alterations as fairly come within the scope of the appended claims.

I claim:—

1. A device of the character described including a frame; a quill fixed in the frame; a planetary gear unit comprising a main shaft rotatable in the frame and in the quill, a sun gear fixed on the main shaft, a sun gear rotatable on the main shaft and having a hub, a gear case rotatable on the main shaft and on the hub, planetary gears meshing with the sun gears and with each other, and a gear on the gear case; an auxiliary shaft rotatable in the frame; a gear on the auxiliary shaft meshing with the gear on the gear case; a gear fixed on the hub; a sleeve rotatable on the auxiliary shaft; a gear on the sleeve meshing with the gear on the hub; a gear rotatable on the quill; a gear on the sleeve meshing with the gear on the quill; and means for yieldingly holding the gear on the quill against rotation.

2. A device of the character described including a frame; a quill fixed in the frame; a planetary gear unit comprising a main shaft rotatable in the frame and in the quill, a sun gear fixed on the main shaft, a sun gear rotatable on the main shaft and having a hub, a gear case rotatable on the main shaft and on the hub, planetary gears meshing with the sun gears and with each other, and a gear on the gear case; an auxiliary shaft rotatable in the frame; a gear on the auxiliary shaft meshing with the gear on the gear case; a gear fixed on the hub; a sleeve rotatable on the auxiliary shaft; a gear on the sleeve meshing with the gear on the hub; a gear rotatable on the quill; a gear on the sleeve meshing with the gear on the quill; and a spring having one end connected to the gear on the quill and its other end secured to the quill whereby said spring tends to hold said gear against rotation.

3. A device of the character described including a frame; a quill fixed in the frame; a planetary gear unit, as described, comprising a main shaft rotatable in the frame and in the quill, a sun gear fixed on the main shaft, a sun gear rotatable on the main shaft and having a hub, a gear case rotatable on the main shaft and on the hub, planetary gears meshing with the sun gears and with each other, and a gear on the gear case; an auxiliary shaft rotatable in the frame; a gear on the auxiliary shaft meshing with the gear on the gear case; a gear fixed on the hub; a sleeve rotatable on the auxiliary shaft; a gear on the sleeve meshing with the gear on the hub; a gear rotatable on the quill; a gear on the sleeve meshing with the gear on the quill; a drum secured to the gear on the quill; and a spiral spring, having one of its ends secured to the drum and its other end secured to the quill, tending to hold the drum against rotation.

4. A device of the character described including a frame, a driving shaft rotatable therein, a sun gear fixed on the shaft, a second sun gear rotatable on the shaft and having a hub, a gear case rotatable on the shaft and on the hub, planetary gears rotatable in the gear case and meshing with the fixed sun gear, planetary gears rotatable in the gear case and meshing with the rotatable sun gear and with the other planetary gears, a gear fixed on the hub, a cushioning device rotatable in the frame, a driven shaft rotatable in the frame and geared to the gear case, and gears carried by the driven shaft coacting with the hub and cushioning device.

In testimony whereof I have signed my name to this specification.

PATRICK J. KILCULLEN.